United States Patent [19]

Starr

[11] Patent Number: 4,720,760

[45] Date of Patent: Jan. 19, 1988

[54] ELECTRICAL SURGE PROTECTION

[75] Inventor: Tom Starr, Sussex, England

[73] Assignee: Bowthorpe Emp Limited, Brighton, England

[21] Appl. No.: 758,615

[22] Filed: Jul. 24, 1985

[30] Foreign Application Priority Data

Jul. 24, 1984 [GB] United Kingdom ................. 8418779

[51] Int. Cl.[4] ................................................ H02H 1/04

[52] U.S. Cl. .................................... 361/128; 361/111; 361/129; 439/106; 439/577

[58] Field of Search .................. 361/56, 111, 127-129, 361/91; 339/62, 147 P; 338/21

[56] References Cited

U.S. PATENT DOCUMENTS

| | | | |
|---|---|---|---|
| 3,768,058 | 10/1973 | Harnden, Jr. | 361/56 |
| 3,821,686 | 6/1974 | Harnden, Jr. | 361/56 |
| 4,089,032 | 5/1978 | Orfano | 361/56 |
| 4,212,045 | 7/1980 | Martzloff | 361/56 |
| 4,316,171 | 2/1982 | Miyabayashi et al. | 338/21 |
| 4,318,578 | 3/1982 | Ericson et al. | 339/147 P |

OTHER PUBLICATIONS

Safety Plugs, *Practical Engineer,* vol. 14, No. 16, (Dec. 1978), pp. 1240-1241; T. Sutherns.

*Primary Examiner*—A. D. Pellinen
*Assistant Examiner*—Jeffrey A. Gaffin
*Attorney, Agent, or Firm*—Pollock, Vande Sande & Priddy

[57] ABSTRACT

A mains electrical plug incorporates a zinc oxide non-linear resistor device (10) in the form of a circular zinc oxide disc having three electrode portions (2) provided on one face and contacting the earth, neutral and live pins (5) of the plug and a single electrode (3) on its other face, the device (10) thereby providing surge protection to the three electrical circuits provided within the plug.

6 Claims, 6 Drawing Figures

ELECTRICAL SURGE PROTECTION

FIELD OF THE INVENTION

This invention generally relates to electrical surge protection and more particularly, though not exclusively, concerns an electrical connector such as a plug or socket outlet which provides for the protection of electrical equipment and appliances against the adverse effects of surges or transient overvoltages arising in their mains electrical power supply cables on account, for example, of lightning strikes or switching transients arising from electricity distribution equipment or from nearby "noisy" appliances.

BACKGROUND OF THE INVENTION

Bowthorpe EMP Ltd., of Stevenson Road, Brighton, East Sussex, England, have recently marketed with considerable success a surge protector plug comprising a generally standard British style 13 amp 3-pin plug constructed to BS1363 and incorporating a three-element non-linear resistor assembly connected in delta configuration with the three pins of the plug, the arrangement being such that transient overvoltages at any of the plug pins will be substantially instantaneously suppressed by breakdown of a respective one or more of the non-linear resistors so as to conduct the transient to ground. The non-linear resistor assembly of this plug comprises a ceramic tube within which were contained three non-linear resistor discs formed of a zinc oxide based material and each having electrodes provided on their opposed faces, the three zinc oxide discs being stacked within the ceramic tube and metallic conductor discs being interposed between the zinc oxide discs in the stack and provided at the ends of the stack and having lead portions extending out of the stack and out of the ceramic tube and connecting to the respective plug pins. However, whereas no great difficulty was experienced in incorporating such a non-linear resistor assembly into the standard British style plug, difficulties were encountered in similarly adapting the various forms of plugs used as standard in other countries within Europe and also further afield primarily on account of the bulky nature of the non-linear resistor assembly.

To the Applicants knowledge and belief, few previous proposals have been made for the incorporation of non-linear resistor materials into power connectors for the purposes of surge suppression. One such previous proposal is described in U.S. Pat. No. 3,821,686 (Harnden) which discloses several embodiments most of which involve the provision of a two-pin plug or socket connector formed with a varistor block disc or wafer incorporated into the connector body or onto a front surface thereof, and only one of which concerns a three-pin connector with an earth/ground contact. In the disclosed two-pin connectors, the arrangements are either inefficient as regards the electrical connections made between the pins and the non-linear resistor material or are wasteful in terms of the amount of non-linear resistor material utilized; for example, the embodiment wherein the varistor is provided at the front face of the plug has poor provision for reliable electrical contact between the plug pins and the varistor and exposes the varistor to surface contamination with consequent deterioration of its effectiveness. In the disclosed three-pin connector, whilst more economical use is made of varistor material, the varistors being provided in the form of relatively small discs, the connections to the varistors are uncertain and no varistor is provided to accommodate L-N mode transients, and only L-E and N-E modes are provided for.

British Patent Specification GB-A-2 119 182 (ITT Industries Inc.) discloses an electrical connector for signal lines of data processing equipment, and not an electrical power connector. In the arrangement disclosed, a wafer of zinc oxide or other varistor material has a plurality of spaced-apart electrodes on one face and a ground electrode on its opposed face and the plurality of pin contacts provided in the connector each include a spring finger contacting a respective one of the spaced-apart electordes. European Patent Specification EP-A-0018067 (Reliable Electric Company) discloses a line protector for a communications circuit, and again not an electrical power connector. In the arrangement disclosed, a varistor body has an electrode on one face coupled to a ground pin and on its opposite face has a pair of spaced-apart electrodes coupled to respective ones of two line pins, and there are furthermore provided a pair of spring clips which span the thickness of the varistor body and would short the spaced-apart line electrodes to the ground electrode were it not for the provision of an insulating sheet which is adapted to melt under high surge conditions. Such an arrangement would be unsuitable for a power line connector since the occurrence of a transient such as to melt the insulating sheet would place a short-circuit of substantial current carrying capability directly between the live and/or neutral power lines and earth with potentially disastrous consequences.

Other prior art material of marginal interest to the present invention is disclosed in U.S. Pat. No. 3,742,420 (Harnden, Jr.) which discloses a metal oxide varistor wafer with feed-through holes for the electrodes of an electrical device such as a semiconductor MOSFET for protecting the device against transient surges, in U.S. Pat. No. 3,768,058 (Harnden, Jr.) which discloses a metal oxide varistor circuit component comprising a body of defined thickness having a continuous electrode on one surface and a plurality of electrodes on an opposed surface having interelectrode spacings of defined width less than the wafer thickness forming conduction gaps, in U.S. Pat. No. 4,316,171 (Miyabayashi et al) which discloses a titanium dioxide based varistor adapted for use as a noise suppressor in DC motors and comprising an annular body having three electrodes provided on one surface in equally divided sectors and a single annular electrode provided on the opposite surface, and in U.S. Pat. No. 4,212,045 (Martzloff) which discloses a multiterminal varistor configuration particularly adapted for the protection of polyphase electrical circuits such as low-voltage polyphase AC motor. None of the aforesaid patents concerns the provision of transient protection in mains power supply connectors.

OBJECTS AND SUMMARY OF THE INVENTION

The present invention is aimed generally at alleviating the difficulties abovementioned of incorporating surge protection into a mains power connector firstly by utilization of a new and improved non-linear resistor configuration, and secondly by utilization of a simple means of incorporating such a non-linear resistor configuration into a host connector such as an electric plug.

In both of these aspects, however, the present invention is seen as having wider application than merely to the field of surge suppression plugs and is not to be regarded as limited thereto.

According to the present invention therefore in a first aspect a unitary multiple non-linear resistor device, such as has conventionally been constructed by stacking the requisite number of non-linear resistor bodies with electrical contacts therebetween, is instead configured as a flat plate or disc of non-linear resistor material having a plurality of discrete first electrodes formed on one surface thereof for cooperation jointly with a second electrode formed on the other surface of the plate or disc, said first electrodes being spaced apart from each other on said one surface by such a distance relative to the thickness of the plate or disc of non-linear resistance material and the position of the cooperating second electrode that in the event of a surge overvoltage appearing between adjacent ones of said first electrodes the preferential surge current conduction path therebetween is through the thickness of the plate or disc to the cooperating second electrode and thence back through the thickness of the plate or disc.

As applied to a three-pin electrical plug or socket power supply connector, a unitary multiple nonlinear resistor device in accordance with the present invention might therefore comprise a circular or annular disc of on-linear resistor material having three similar electrodes on one side thereof constituting the said first electrodes and having a single electrode extending over substantially all of the other surface constituting the said second electrode, and with the first electrodes being spaced apart from each other on the respective surface of the disc by a distance at least equal to and preferably greater than twice the thickness of the disc.

In the design of the first electrodes of the unitary multiple non-linear resistor device according to the invention, consideration advantageously is given to the electric field distribution arising therebetween in the event of a transient overvoltage with a view to the avoidance of highly localized areas of electrical stress being established in the device which could lead to the destruction of the device. The adjoining edges of adjacent ones of the first electrodes thus are preferably formed for an even electric field distribution between the electrodes. The form of the first and second electrodes and/or the nature and thickness of the non-linear resistor plate or disc furthermore is desirably such as to ensure that the device tends to a short-circuit failure mode designed to ensure operation of an associated local or external fuse.

According to the present invention in a second aspect, there is provided an electrical power supply connector, such as a mains electrical power plug having terminal pins projecting therefrom for engagement with complementary socket outlet terminals of a mains electrical socket outlet having such socket outlet terminals, including a unitary multiple non-linear resistor device comprising a flat plate or disc of non-linear resistor material having a plurality of spaced-apart first electrodes formed on one surface thereof for cooperation with at least one second electrode formed on the opposite surface of the plate or disc and extending over substantially all of the said opposite surface, and means electrically coupling said spaced-apart first electrodes with said terminals whereby said non-linear resistor device provides surge protection for said connector, said first electrodes being spaced apart from each other by a distance of at least equal to twice the thickness of said flat plate or disc.

An exemplary embodiment of this second aspect comprises an electrical plug having a plug body portion with terminal pins mounted therein and projecting therefrom for engagement with complementary socket terminals, and a plug cap or top cover portion incorporating said multiple non-linear resistor device and provided with contacts engaged with said spaced-apart first electrodes, said contacts engaging the terminal pins of the plug, internally of the plug, when the cap or top cover is assembled with the plug body portion.

As will be explained in detail hereinafter, in the field of surge suppression plugs the present invention in its first aspect provides a non-linear resistor device which is compact and so can readily be incorporated into the plug and furthermore has attractive electrical characteristics, and in its second aspect provides a simple and effective means of contacting the non-linear resistor device with the terminals of the connector.

Further objects, features and advantages of the invention will best be understood from consideration of the following description given with reference to the accompanying drawings.

DESCRIPTION OF THE EMBODIMENTS

Figure 1A:
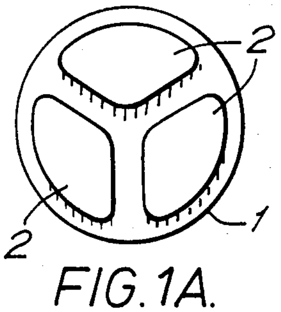
FIGS. 1A, 1B and 1C illustrate an exemplary non-linear resistor device embodying the above-mentioned first aspect of the invention
Figure 1B:
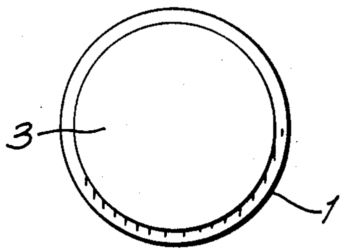
Figure 1C:
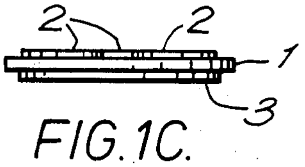
Figure 1D:
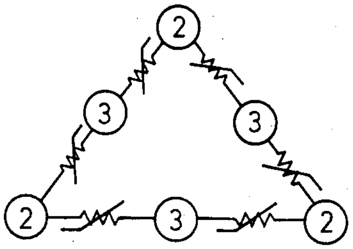
FIG. 1D is the equivalent electrical circuit of such a device.

Referring first to FIGS. 1A to 1D, the non-linear resistor device shown therein comprises a flat disc 1 of non-linear resistance material such as for example zinc oxide along with other metal oxide additives such as bismuth oxide, cobalt oxide, chromium oxide, etc. as is well known in the non-linear varistor art. The disc 1 has on one surface thereof three electrodes 2 intimately contacting the surface of the disc, and on its opposite surface has a single electrode 3 covering substantially the entire surface area of the disc. The electrodes 2 and 3 may be applied to the disc surfaces in a variety of known manners such as by screen printing of electrically conductive paint or by vacuum deposition of suitable metallic materials, for example.

The electrodes 2 and/or 3 can be shaped in any desired manner to suit the intended use of the device and more or less than three electrodes 2 can be provided. Likewise the body of the device need not be a circular disc and an alternative device might comprise a rectangular wafer packaged for example as a dual inline (DIP) device having a plurality of separate circuits. However, for a power supply surge arrester application the electrodes 2 are desirably shaped generally as shown for optimum utilization of non-linear resistor material in order to optimize the surge current carrying capability of the device, and also for even electric field distribution between adjacent electrodes so as to avoid local overstressing of the device as might occur if the electrode areas 2 had sharp discontinuities in their external profiles.

The electrodes 2 are desirably spaced apart from one another on the respective surfce of the disc 1 by a distance greater than twice the thickness of the disc so that the non-linear resistances between the electrodes 2 and the oppositely located portions of the electrode 3 on the other side of the disc predominate in the active electrical characteristics of the device as compared to the resistances which would be present between the electrode portions 2 even if the electrode 3 were omitted. With such a configuration, each circuit from one of the electrodes 2 through the thickness of the disc 1 to the electrode 3 and back through the disc thickness to another of the electrodes 2 acts independently of the other like circuits coupled to it, so that if the device of FIGS. 1A to 1D were to be incorporated into an electric plug with the electrodes 2 coupled to the plug line, neutral and earth terminals L, N and E and the electrode 3 allowed to float, then independent surge protection would be provided for all surge modes L-N, L-E and N-E.

The device of FIGS. 1A to 1D is further advantageous in that since the current traverses the disc 1 twice in travelling from one electrode 2 to another, therefore for a given rating the disc can be half the thickness which conventionally would have been required in a configuration where the current traversed the disc thickness only once. The resulting thinness of the disc for a given desired rating coupled with a proper design of the electrodes and selection of the non-linear resistor material contributes to the device having an overload surge current failure mode designed to produce a permanent short-circuit through the device and between the respective pair of electrodes 2 across which the surge occurred. This short-circuit failure mode results from dielectric breakdown of the zinc oxide varistor material between the opposed electrodes on the major surfaces of the disc which in effect punches current tracks through the varistor material and deposits electrode metallizations throughout the tracks. Another advantage of the device results from its reduced capacitance as compared with the non-linear resistor stack employed in the previously mentioned surge protector plug available from Bowthorpe EMP Ltd., the reduced capacitance enabling the unitary multiple non-linear resistor device to be used more readily in circuits, such as those involving digital equipment, which cannot tolerate high capacitance.

Figure 2:
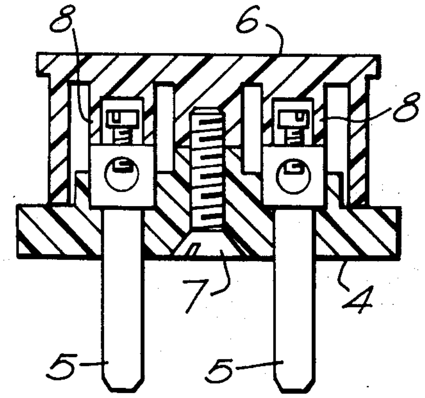
FIG. 2 illustrates the construction of a conventional British style electrical plug.
Figure 3:
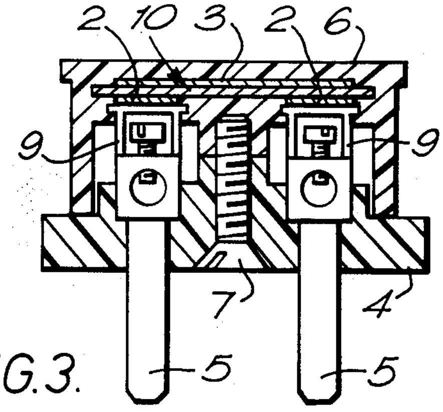
FIG. 3 illustrates a British style electrical plug embodying the above-mentioned second aspect of the present invention and incorporating a non-linear resistor device according to FIGS. 1A, 1B and 1C.

FIG. 2 illustrates schematically a conventional British style plug design wherein the plug comprses an electrically-insulating base 4 with terminals 5 mounted therein, and an electrically-insulating top cap or cover 6 adapted to be secured to the base 4 by means of a screw 7, the cover 6 having formations 8 adapted to abut the upper surfaces of the terminals 5 when the cover 6 is secured to the plug base 4. FIG. 3 shows the plug of FIG. 2 modified in accordance with one aspect of the present invention so as to incorporate a surge protection device as hereinbefore described with reference to FIGS. 1A to 1D in the cover 6 of the plug. As schematically shown in FIG. 3, the plug cover 6 has electrically conductive sleeve contacts 9 provided therein so as to abut the terminals 5 when the cover 6 is secured to the plug base 4, and a device 10 as hereinbefore described with reference to FIGS. 1A to 1D is incorporated into the plug cover 6 with its electrodes 2 electrically contacting respective ones of the sleeve contacts 9.

The requisite contact pressures between the sleeve contacts 9, the terminals 5 and the electrodes 2 of the device 10 can be assured by appropriately dimensioning the various parts of the plug such that when the screw 7 is tightened to secure the cover 6 to the base 4 the required contact pressures are established, and/or by incorporation of appropriate spring biassing means into the design for example by providing for the device 10 and the sleeve contacts 9 a degree of movement within the cover 6 and providing spring biassing means (an electrically-insulating elastomeric layer for example between the electrode 3 of the device 10 and the adjacent wall of the cover 6) urging the device 10 and contacts 9 towards the plug base 4.

By virtue of the non-linear resistor device 10 desirably having a short-circuit failure mode in the event of an excessively high surge, as opposed to an open-circuit failure mode, it is ensured that in the event of failure of the device 10 an associated electrical fuse provided either in the plug or externally thereof in the mains distribution circuit will blow thereby disconnecting the plug from the mains power supply. It is thus not possible to lose the surge protection afforded by the device 10 and yet retain electrical connection to the power supply, which is clearly advantageous in situations where surge protection is vital.

It is to be clearly understood that the arrangeent of FIG. 3 is exemplary only and that many modifications and variations can be made thereto without departure from the spirit and scope of the present invention. Thus, for example, the contact sleeves 9 could be replaced by alternative forms of contacts performing the same function, such as appropriately formed leaf spring contacts for example, and suited to the particular design and configuration of the plug in question. By this means it is envisaged that alternative forms of electrical plugs such as those commonly used in the European mainland (as opposed to the UK) or in the USA could be adapted to as to provide internal connections within the plug body between the plug terminal pins and a surge protector device as described. Also whilst described in the foregoing in relation to an electrical mains power plug, the invention could equally well be embodied in a corresponding socket outlet. The invention furthermore as regards the usefulness of the non-linear resistor device per se is not to be seen as restricted to the field of surge protector plugs, or corresponding socket outlets, though clearly such field is seen as a principal application of the invention. A unitary multiple non-linear resistor device according to the invention could advantageously be utilized with a printed circuit board serving as a mounting for other electrical components, the device being designed to provide transient protection of power circuits on the printed circuit board for example and being in suitable form for utilization in a surface mounted (leadless) arrangement. Additionally, whilst an exemplary form of plug embodying the invention has been described in the foregoing, the plug being adapted to be fitted to the mains power supply lead of an electrically powered apparatus and being engageable with a complementary socket outlet, the invention could alternatively be embodied in a "blind" plug having no provision for connection thereto of a power supply lead. Such a blind plug could be plugged into one of the outlets of a multiple socket outlet and would thereby provide surge protection to an appliance plugged into another outlet of the same multiple socket outlet.

I claim:

1. An electrical power supply connector, such as a mains electrical power plug having live (L), neutral (N)

and earth (E) terminal for engagement with complementary L, N and E socket outlet terminals or a mains electrical socket outlet having such L, N and E socket outlet terminals, said connector including a unitary multiple non-linear resistor device comprising a flat plate of non-linear resistor material having three spaced-apart first electrodes formed on one surface thereof for cooperation jointly with a second electrode formed on the opposite surface of the plate and means electrically coupling each of said spaced-apart first electrodes with a respective one of said L, N and E terminals whereby said non-linear resistor device provides independent surge protection for said connector for all of the surge modes L-N, L-E, and N-E, said first electrodes being spaced apart from each other on said one surface of said plate by such a distance relative to the thickness of the plate and the position of the cooperating second electrode that in the event of a surge overvoltage appearing between any two of said first electrodes, the preferential surge current conduction path therebetween is from one of said any two of said first electrodes through the thickness of the plate or disc to the cooperating second electrode and thence back through the thickness of the plate or disc to the other of said any two of said first electrodes, and the non-linear resistor device furthermore being adapted to fail in a short-circuit mode in the event of an excessive surge current being carried between any two of said first electrodes.

2. An electrical power supply connector according to claim 1, wherein said non-linear resistor device comprises zinc oxide non-linear resistor material.

3. An electrical power supply connector according to claim 1, wherein said non-linear resistor device comprises a flat generally circular disc having three generally sector-shaped first electrodes evenly spaced with respect to each other on said one surface thereof and having a generally circular second electrode on said opposite surface thereof in registry across the thickness of the disc with said three first electrodes.

4. An electrical power supply connector according to claim 3, wherein said three first electrodes are spaced apart from each other by a distance greater than twice the thickness of the disc.

5. An electrical power supply connector according to claim 1, comprised of an electrical plug having a plug body portion with terminal pins mounted therein and projecting therefrom, and a plug cap or top cover portion incorporating said multiple non-linear resistor device and provided with contacts engaged with said spaced-apart first electrodes, said contacts being adapted to make engagement with said terminals pins, internally of the plug, when the cap or top cover is assembled with the plug body portion.

6. A surge protection device protecting an electrically powered apparatus having a fused power supply connection to the mains electrical power supply from transient surges developed in said power supply, said device comprising an electrically insulating body, line (L), neutral (N) and earth (E) terminal in said body for connection to respective L, N and E conductors of a mains power distribution line, and a unitary multiple non-linear resistor device provided in said body and establishing independent surge protection for all of the surge modes L-N, L-E and N-E, said device comprising a flat disc of non-linear resistor material having three spaced-apart first electrodes formed on one major surface thereof and each in electrical contact with a respective one of said L, N and E terminals, and at least one second electrode formed on the opposite surface of said disc for cooperation with said first electrodes in a surge suppression made in which, in the event of a surge overvoltage in conductors of said mains power distribution line appearing between any two of said first electrodes, electrical conduction occurs between the respective two first electrodes via the second electrode in a path which traverses the thickness of the disc twice, the spacing apart of said first electrodes from each other being such as to inhibit direct conduction between any two of said first electrodes without involvement of said second electrode, and the arrangement of said non-linear resistor device being such that in the event of an excessive surge current being carried by the device, the device will fail in a short circuit mode so as to cause said fused power supply connection to be disrupted by operation of a fuse.

* * * * *